(12) United States Patent
LeGrand, III et al.

(10) Patent No.: US 12,565,337 B2
(45) Date of Patent: Mar. 3, 2026

(54) SATELLITES AND SATELLITE STACKS FOR LAUNCH

(71) Applicant: Hubble Network Inc., Seattle, WA (US)

(72) Inventors: Louis L. LeGrand, III, Seattle, WA (US); David Paauwe, Petaluma, CA (US); John S.L. Kim, Seattle, WA (US); Ben Juda Wild, Bee Cave, TX (US)

(73) Assignee: Hubble Network Inc., Seattle, WA (US)

( * ) Notice: Subject to any disclaimer, the term of this patent is extended or adjusted under 35 U.S.C. 154(b) by 0 days.

(21) Appl. No.: 18/912,438

(22) Filed: Oct. 10, 2024

(65) Prior Publication Data

US 2025/0236418 A1 Jul. 24, 2025

Related U.S. Application Data

(60) Provisional application No. 63/622,110, filed on Jan. 18, 2024.

(51) Int. Cl.
B64G 1/22 (2006.01)
B64G 1/10 (2006.01)
B64G 1/64 (2006.01)
B64G 1/44 (2006.01)

(52) U.S. Cl.
CPC .............. B64G 1/223 (2023.08); B64G 1/64 (2013.01); *B64G 1/1007* (2013.01); *B64G 1/443* (2013.01)

(58) Field of Classification Search
CPC ...... B64G 1/1007; B64G 1/223; B64G 1/641; B64G 1/643; B64G 1/644
See application file for complete search history.

(56) References Cited

U.S. PATENT DOCUMENTS

| | | | | |
|---|---|---|---|---|
| 11,492,147 B2 * | 11/2022 | Welle | ..................... | B64G 1/64 |
| 2024/0416406 A1 * | 12/2024 | Colas | ..................... | B64G 1/22 |

* cited by examiner

*Primary Examiner* — Nicholas McFall
(74) *Attorney, Agent, or Firm* — Nicholson De Vos Webster & Elliott LLP

(57) ABSTRACT

A satellite stack includes satellites arranged in a stack, where each satellite in the stack has a planar portion with an associated support structure and a subsystems housing containing satellite subsystems extending along an edge of the planar portion. For each satellite, a height of the subsystems housing is greater than a combined height of the planar portion and the associated support structure. Each satellite is oriented at a nonzero rotational angle with respect to the satellite immediately beneath, such that no satellite has its subsystems housing positioned directly above the subsystems housing of the satellite immediately beneath.

20 Claims, 17 Drawing Sheets

SATELLITES AND SATELLITE STACKS FOR LAUNCH

CROSS-REFERENCE TO RELATED APPLICATION

This application is a continuation of U.S. Patent Application Ser. No. 63/622,110, filed on Jan. 18, 2024, the entire contents of which are hereby incorporated by reference as if fully set forth.

BACKGROUND

Artificial Earth satellites (referred to going forward as satellites) are spacecraft placed into orbit around Earth. Satellites have a variety of uses, including communication relay, weather forecasting, navigation (e.g., GPS), broadcasting, scientific research, and Earth observation. Satellites are placed into orbit by launch vehicles (e.g., rockets), typically high enough to avoid orbital decay caused by friction from Earth's atmosphere. Satellites can then change or maintain their orbit by propulsion, using chemical or ion thrusters, for example.

BRIEF DESCRIPTION OF DRAWINGS

Various examples in accordance with the present disclosure will be described with reference to the drawings, in which.

DETAILED DESCRIPTION

The present disclosure relates to satellites, and is particularly well suited to small-volume low-mass satellites with large aperture areas for telecommunication applications, though applications to other types of satellites are also contemplated. Satellites are typically designed with structural support features to make them rugged enough to withstand the extreme accelerations and stresses they experience during launch. Once a satellite is in orbit, however, the zero-g environment that it remains in for the remainder of its life is fairly benign with respect to the stresses that the structure needs to withstand. Since launch cost is directly proportional to satellite mass, it is beneficial to reduce satellite mass while still ensuring the structure is rugged enough to withstand the launch environment.

The present disclosure is directed to solving the technical problem of how to build low-mass satellites having structural features that allow them to survive the launch environment without adding significant mass. As described below, some of the present embodiments solve this technical problem by using a thin form factor for individual satellites while tailoring the geometry of the satellites so that multiple satellites can be arranged in a tightly nested stack. The satellites within the stack support one another such that the stack as a whole is much more resistant to the stresses of the launch environment than any of the satellites would be individually. A support base at the bottom of the stack supports the lowermost satellites in the stack. While the present technical solution is particularly useful for telecommunications satellites, it may also be useful for other types of satellites.

Figure 1:
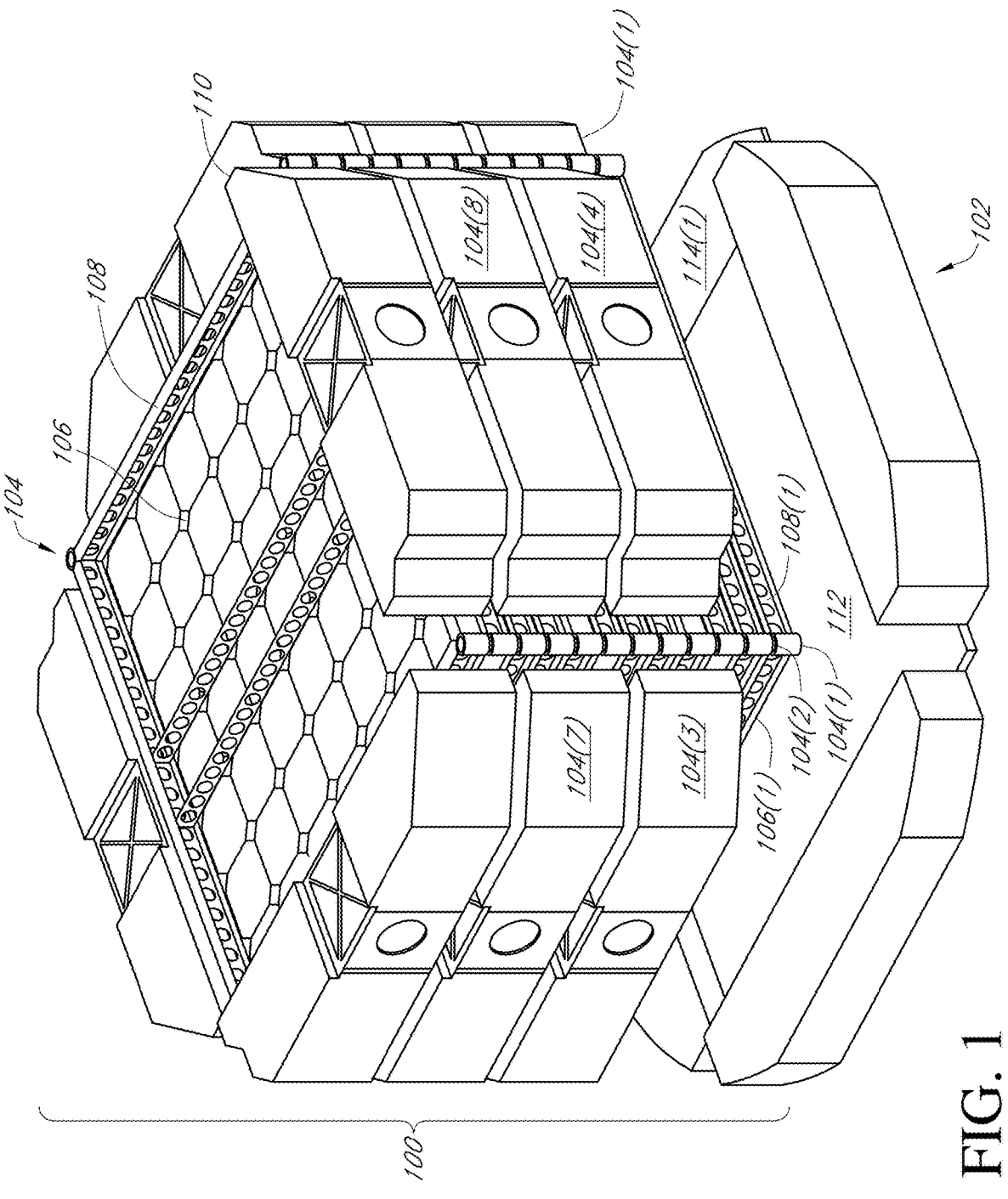
FIG. 1 is an upper (zenith-facing side when in orbit) perspective view of a satellite stack with support base according to some examples.
Figure 2:
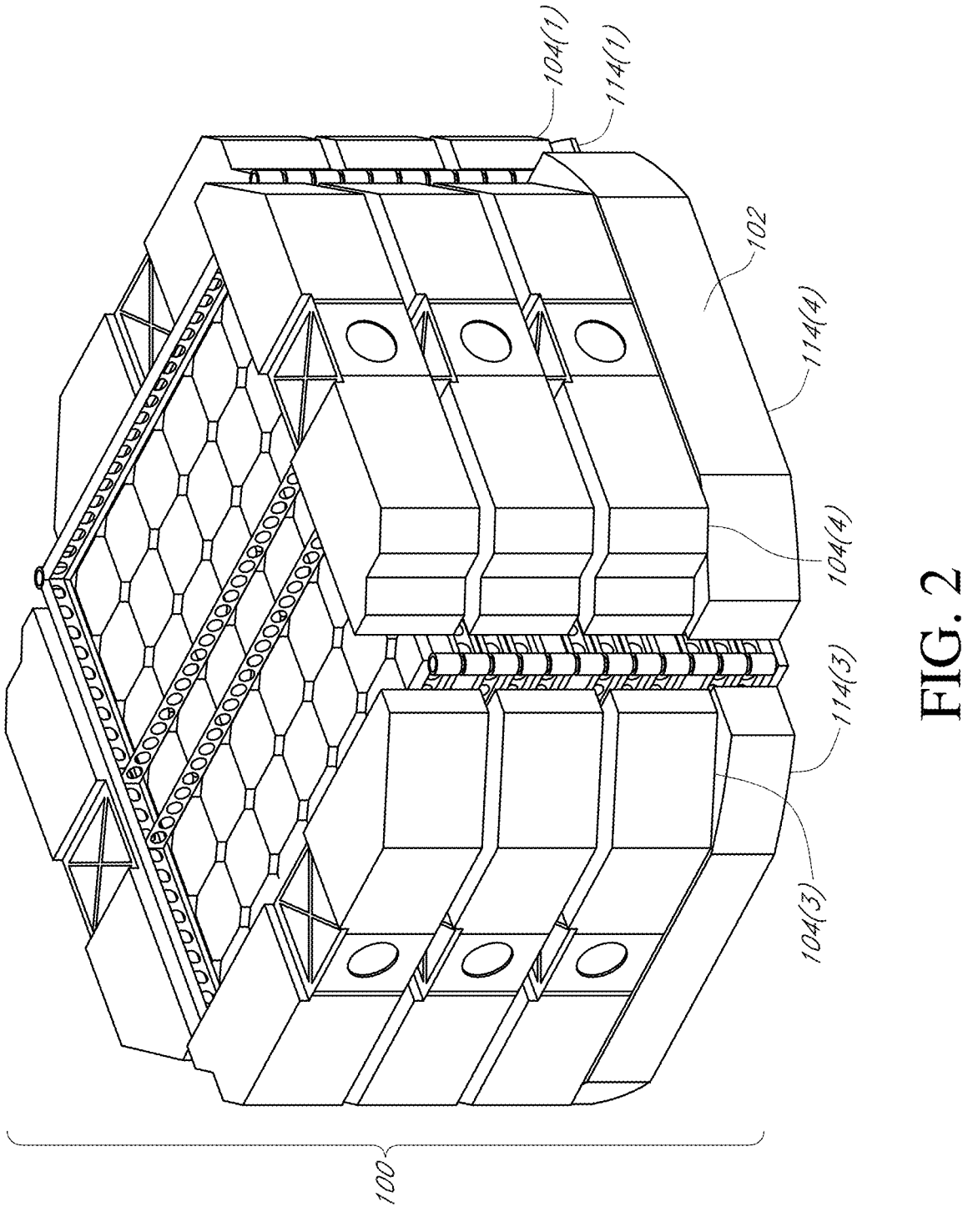
FIG. 2 is an upper perspective view of the satellite stack and support base of FIG. 1, showing the satellite stack nested within the support base according to some examples.
Figure 3:
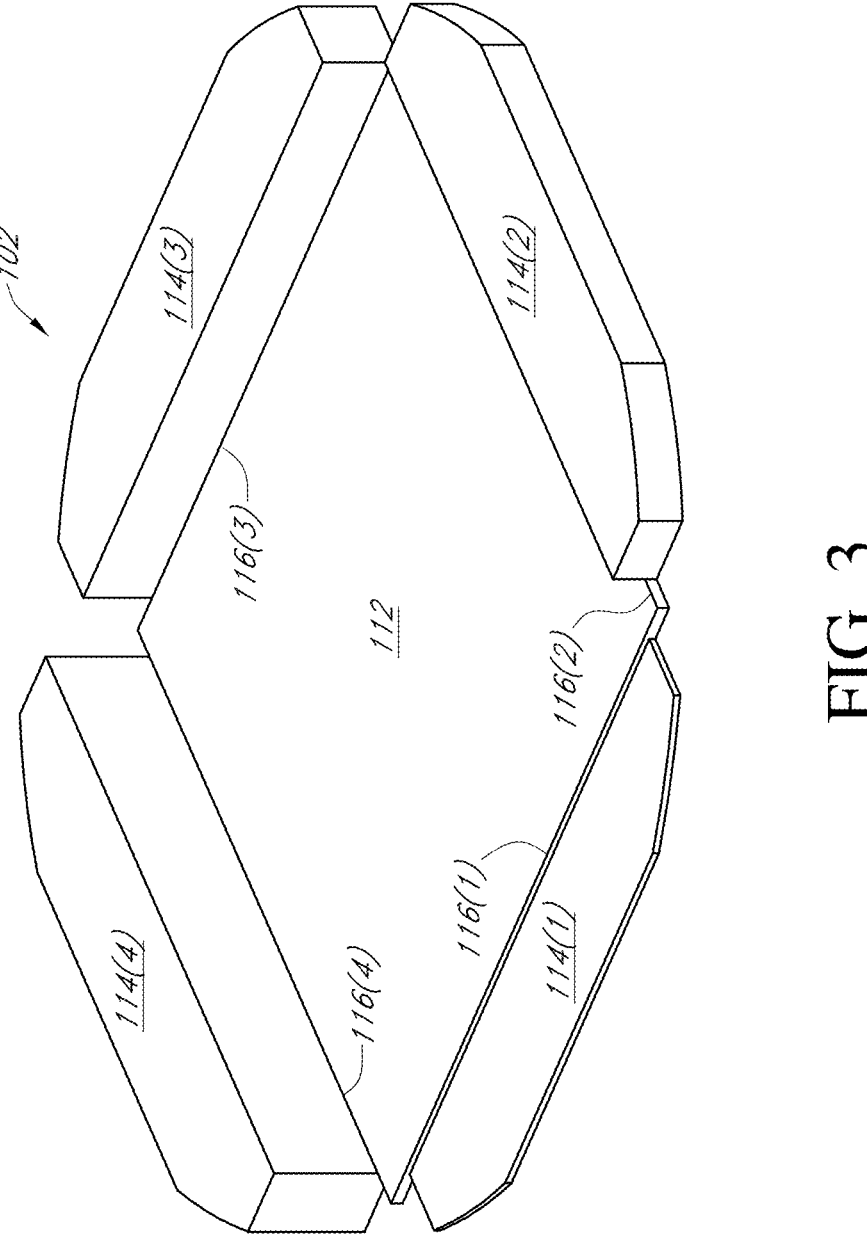
FIG. 3 is an upper perspective view of the support base of FIG. 1 according to some examples.

FIGS. 1-3 illustrate a satellite stack 100 with support base 102 according to some examples. With reference to FIG. 1, the satellite stack 100 comprises satellites 104 arranged in a stack such that the satellites 104 at least partially overlap and overlie one another. In the illustrated embodiment, the stack 100 includes twelve satellites 104, but in various embodiments the stack 100 may include any number of satellites. The structure and configuration of the individual satellites 104 are described in greater detail below with reference to FIGS. 4-7, which illustrate one of the satellites 104 in isolation. Briefly, however, each satellite 104 in the stack 100 has a planar portion 106 with an associated support structure 108 and a subsystems housing 110 containing satellite subsystems extending along an edge of the planar portion 106. For each satellite, a height of the subsystems housing 110 is greater than a combined height of the planar portion 106 and the associated support structure 108. In some embodiments, the subsystems housing 110 extends along only one edge of the planar portion 106 of the satellite 104.

Each satellite 104 in the stack 100 is oriented at a nonzero rotational angle with respect to the satellite 104 immediately beneath, such that no satellite 104 has its subsystems housing 110 positioned directly above the subsystems housing 110 of the satellite 104 immediately beneath. However, the subsystems housings 110 in a first subgroup of the satellites 104 toward the top of the stack 100 are supported by the subsystems housings 110 of other satellites 104 farther down in the stack 100. In the illustrated embodiment, the rotational angle of each satellite 104 with respect to the satellite 104 immediately beneath is 90°, such that the subsystems housings 110 for the satellites 104 in the first subgroup are supported by the subsystems housings 110 of the satellite 104 that is four positions downward in the stack 100. For example, the satellite 104(8) that is eighth from the bottom of the stack 100 has its subsystems housing 110 supported by the subsystems housing 110 of the satellite 104(4) that is fourth from the bottom of the stack 100, while the satellite that is seventh 104(7) from the bottom of the stack 100 has its subsystems housing 110 supported by the subsystems housing 110 of the satellite that is third 104(3) from the bottom of the stack 100, and so on. While FIGS. 1 and 2 show gaps between neighboring subsystems housings 110, it should be appreciated that in some embodiments the subsystems housings 110 may be in direct contact with the subsystems housings 110 immediately above and/or below. In some embodiments, gaps between neighboring subsystems housings 110 may be filled with a cushioning material (e.g., foam) to enhance the ability of the subsystems housings 110 to support one another. In some embodiments, the cushioning material may be jettisoned during orbital insertion of the satellites 104.

In alternative embodiments, the rotational angle of each satellite with respect to the satellite immediately beneath may be any angle, such as, without limitation, 180°, or 120°, or 72°, or 60°, or 45°, or any other angle. In such embodiments, the subsystems housings for the satellites in the first subgroup would be supported by the subsystems housings of the satellite that is a different number (other than four) positions downward in the stack. For example, if the rotational angle were 180°, then the subsystems housings for the satellites in the first subgroup would be supported by the subsystems housings of the satellite that is two positions downward in the stack, while if the rotational angle were 120°, then the subsystems housings for the satellites in the first subgroup would be supported by the subsystems housings of the satellite that is three positions downward in the stack, and so on.

The subsystems housings 110 for a second subgroup of the satellites 104 toward the bottom of the stack 100 are supported by the support base 102, as shown in FIG. 2. With reference to FIG. 3, the support base 102 includes a planar central portion 112 and peripheral portions 114 arranged at edges of the central portion 112. Each of the peripheral portions 114 has a different height, with the heights increasing in a stepped manner by a same amount in a first direction around a perimeter of the central portion 112. In particular, a first one of the peripheral portions 114(1) along a first edge 116(1) of the central portion 112 has a first height (or thickness) equal to that of the central portion 112, a second one of the peripheral portions 114(2) along a second edge 116(2) of the central portion 112, adjacent the first edge 116(1), has a second height greater than the first height, a third one of the peripheral portions 114(3) along a third edge 116(3) of the central portion 112, adjacent the second edge 116(2), has a third height greater than the second height, and a fourth one of the peripheral portions 114(4) along a fourth edge 116(4) of the central portion 112, adjacent the third edge 116(3), has a fourth height greater than the third height.

Figures 5, 6:
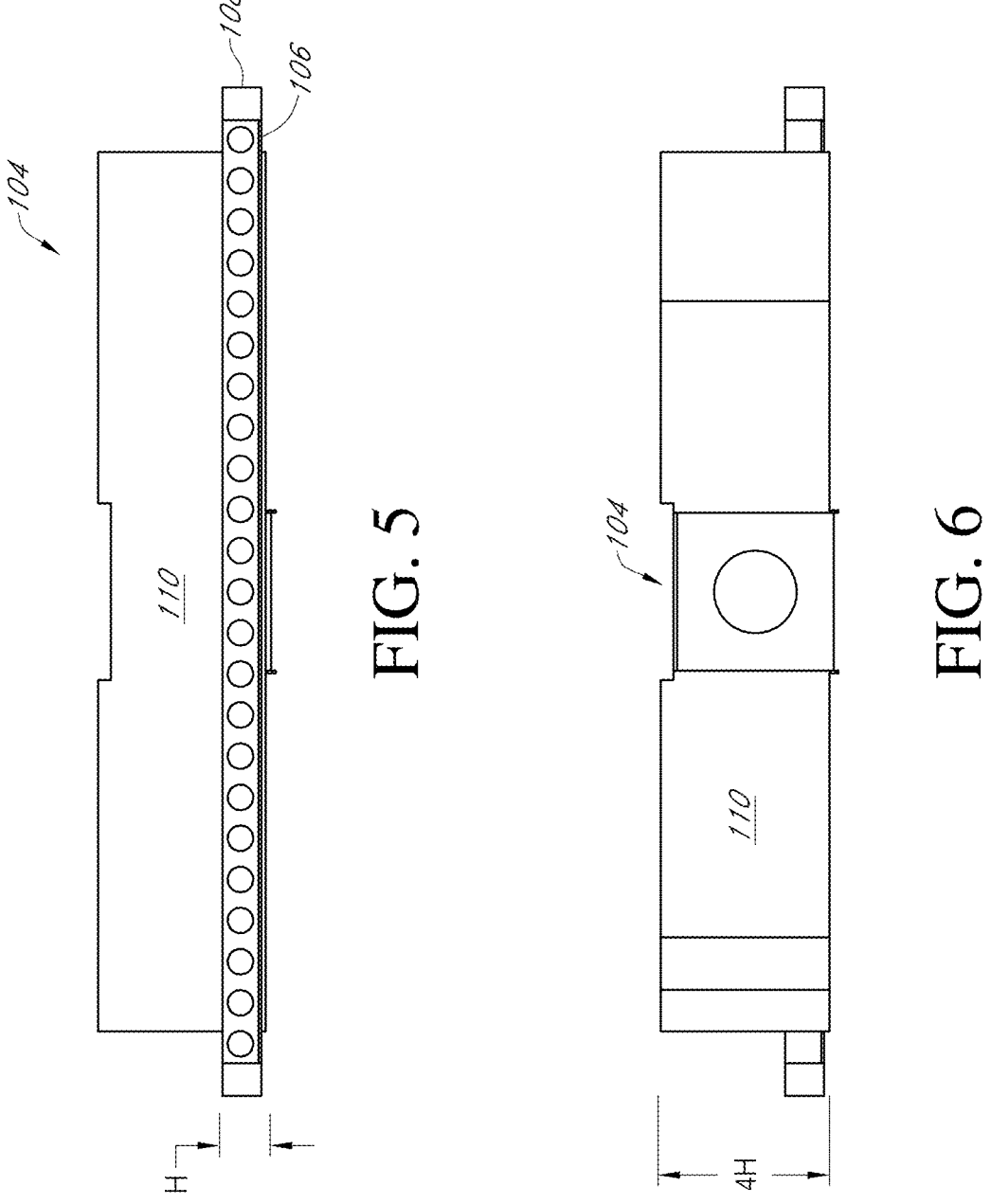
FIGS. 5 and 6 are front and rear views, respectively, of the satellite of FIG. 4 according to some examples.

In some embodiments, the difference in height between each peripheral portion 114 and an adjacent peripheral portion 114 is equal to the combined height H of the planar portion 106 and the associated support structure 108 of the satellite 104 (FIG. 5). Thus, for example, the height difference between the first peripheral portion 114(1) and the second peripheral portion 114(2) is H, the height difference between the second peripheral portion 114(2) and the third peripheral portion 114(3) is H, and the height difference between the third peripheral portion 114(3) and the fourth peripheral portion 114(4) is H. The height difference between the fourth peripheral portion 114(4) and the first peripheral portion 114(1), therefore, is 3H.

In some embodiments, the height of the subsystems housing 110 is a whole-number multiple of the combined height of the planar portion 106 and the associated support structure 108 of the satellite 104. In the illustrated embodiment, since each satellite is rotated 90° with respect to the satellite immediately beneath in the stack 100, the whole-number multiple is four, such that the height of the subsystems housing 110 is 4H (FIG. 6). In alternative embodiments, the whole-number multiple may have a different value, and the value of the whole-number multiple may depend on the rotational angle of successive satellites in the stack. For example, if the rotational angle were 180°, then the whole-number multiple may be two, while if the rotational angle were 120°, then the whole-number multiple may be three, and so on.

In some embodiments, as shown in FIGS. 5 and 6, a lower surface of the planar portion 106 of the satellite 104 is coplanar with a lower surface of the subsystems housing 110. This geometry, coupled with the height of the planar portion 106 and its associated support structure 108(H) relative to the height of the subsystems housing 110 (4H), enables the satellites 104 to be tightly nested in a mutually supportive arrangement when stacked as shown in FIGS. 1 and 2, as described below.

As shown in FIG. 2, the peripheral portions 114 of the support base 102 abut the subsystems housings 110 of respective ones of the satellites 104 in the second subgroup toward the bottom of the stack 100. With reference to FIGS. 1 and 2, a lowermost (or first) satellite 104(1) in the stack 100 rests within the support base 102 such that the first satellite's planar portion 106(1) and associated support structure 108(1) are supported by the planar central portion 112 of the support base 102 and the subsystems housing 110(1) of the first satellite 104(1) is supported by the first peripheral portion 114(1) of the support base 102. A second satellite 104(2) in the stack 100 rests atop the first satellite 104(1) such that the second satellite's planar portion 106(2) and associated support structure 108(2) are supported by the first satellite's planar portion 106(1) and associated support structure 108(1) and, since the second satellite 104(2) is rotated 90° with respect to the first satellite 104(1), and since the height difference between the first peripheral portion 114(1) and the second peripheral portion 114(2) is H (the combined height of the first planar portion 106(1) and the first associated support structure 108(1)), the subsystems housing 110(2) of the second satellite 104(2) is supported by the second peripheral portion 114(2) of the support base 102. A third satellite 104(3) in the stack 100 rests atop the second satellite 104(2) such that the third satellite's planar portion 106(3) and associated support structure 108(3) are supported by the second satellite 104(2)'s planar portion 106(2) and associated support structure 108(2) and, since the third satellite 104(3) is rotated 90° with respect to the second satellite 104(2), and since the height difference between the second peripheral portion 114(2) and the third peripheral portion 114(3) is H (the combined height of the second planar portion 106(2) and the second associated support structure 108(2)), the subsystems housing 110(3) of the third satellite 104(3) is supported by the third peripheral portion 114(3) of the support base 102. A fourth satellite 104(4) in the stack 100 rests atop the third satellite 104(3) such that the fourth satellite's planar portion 106(4) and associated support structure 108(4) are supported by the third satellite's planar portion 106(3) and associated support structure 108(3) and, since the fourth satellite 104(4) is rotated 90° with respect to the third satellite 104(3), and since the height difference between the third peripheral portion 114(3) and the fourth peripheral portion 114(4) is H (the combined height of the third planar portion 106(3) and the third associated support structure 108(3)), the subsystems housing 110(4) of the fourth satellite 104(4) is supported by the fourth peripheral portion 114(4) of the support base 102. A fifth satellite 104(5) in the stack 100 rests atop the fourth satellite 104(4) such that the fifth satellite's planar portion 106(5) and associated support structure 108(5) are supported by the fourth satellite's planar portion 106(4) and associated support structure 108(4) and, since the fifth satellite 104(5) is rotated 90° with respect to the fourth satellite 104(4), and since the height of the first subsystems housing 110(1) is 4H, the subsystems housing 110(5) of the fifth satellite 104(5) is supported by the subsystems housing 110(1) of the first satellite 104(1). Successive satellites 104 in the stack 100 rest atop the satellites 104 beneath such that their planar portions 106 and associated support structures 108 are supported by the planar portions 106 and associated support structures 108 of the satellite 104 immediately beneath, and their subsystems housings 110 are supported by the subsystems housings 110 of the satellites 104 that are four positions downward in the stack 100, as described above.

As described above, the satellites 104 in the satellite stack 100 are tightly nested in a mutually supportive arrangement. In particular, the planar portion 106 and associated support structure 108 of each satellite (except the first satellite 104(1)) abut, and are supported by, the planar portion 106 and associated support structure 108 of the satellite immediately beneath. Similarly, the subsystems housings 110 of each satellite 104 (except the first, second, third, and fourth satellites 104(1)-104(4)) abut, and are supported by, the subsystems housings 110 of the satellite 104 four positions downward in the stack 100. The planar portion 106 and associated support structure 108 of the first satellite 104(1) abuts, and is supported by, the planar central portion 112 of the support base 102, while the subsystems housings 110 of the first, second, third, and fourth satellites 104(1)-104(4) abut, and are supported by, the first, second, third, and fourth peripheral portions 114(1)-114(4), respectively, of the support base 102. The satellite stack 100 and support base 102 thus form a collective whole having substantially greater robustness and resistance to forces of the launch environment as compared to any of the satellites 104 individually. In particular, the support base 102 and/or satellites 104 beneath each satellite 104 provide increased resistance to flexing that could otherwise occur under the influence of the intense g-forces generated by the launch vehicle (e.g., a rocket) during launch. The robustness and flexural rigidity of the satellites 104 is further enhanced by structural features of the individual satellites 104, as described below.

With reference to FIGS. 4-7, and as described above, each satellite 104 includes a planar portion 106 with an associated support structure 108 and a subsystems housing 110 containing satellite subsystems extending along an edge of the planar portion 106. The subsystems housing 110 is an enclosed structure, shaped generally as a rectangular parallelepiped, and having an interior space (not shown) containing satellite subsystems (not shown). In various embodiments, the satellite subsystems may include, without limitation, one or more of the following: propulsion components, power components, reaction wheels, a magnetometer, a processor, an orientation sensor, a star sensor, a sun sensor, or a horizon sensor. In some embodiments, the walls of subsystems housing 110 comprise a material that provides radiation shielding for the satellite subsystems. For example, and without limitation, the walls of subsystems housing 110 may comprise a metal (e.g., aluminum, copper, steel), carbon fiber, plastic, etc.

In some embodiments, the planar portion 106 comprises a printed circuit board (PCB). For example, the PCB may comprise a laminated sandwich structure of conductive and insulating layers. The conductive layers may comprise a pattern of traces, planes, and/or other features (similar to wires on a flat surface) etched from one or more sheet layers of copper or other conductive material laminated onto or between sheet layers of a nonconductive substrate. In some embodiments, the substrate may comprise a composite material, such as a fiber-reinforced plastic having a polymer matrix reinforced with fibers. The fibers may comprise glass, carbon, aramid, or basalt, for example, and the polymer may comprise an epoxy, vinyl ester, or polyester thermosetting plastic, for example.

The planar portion 106 supports a satellite payload, which in some embodiments may comprise one or more radio antennas and one or more solar cells. For example, in the illustrated embodiment, with reference to FIGS. 4 and 7-9, a first surface 118 of the planar portion 106 (zenith when orbiting Earth) includes solar cells 120 and a second surface 122 of the planar portion 106 (nadir when orbiting Earth) includes patch antennas 124. A patch antenna is a type of antenna with a low profile, and which can be mounted on a surface, such as by printing on a dielectric material (e.g., the PCB substrate). A patch antenna includes a planar rectangular, circular, triangular, or any geometrical sheet or patch of metal, mounted over a larger sheet of metal called a ground plane. The two metal sheets together form a resonant piece of microstrip transmission line with a length approximately one-half wavelength of the radio waves.

The solar cells 120 may be electrically coupled to one or more batteries (not shown) within the subsystems housing 110 via conductive traces of the planar portion 106 such that the solar cells 120 recharge the batteries using radiant energy received from the Sun. The patch antennas 124 may be electrically coupled to one or more components (not shown) within the subsystems housing 110, such as a transceiver (or a transmitter and a receiver as separate components), to facilitate radio communication with one or more ground stations on Earth.

Figure 4:
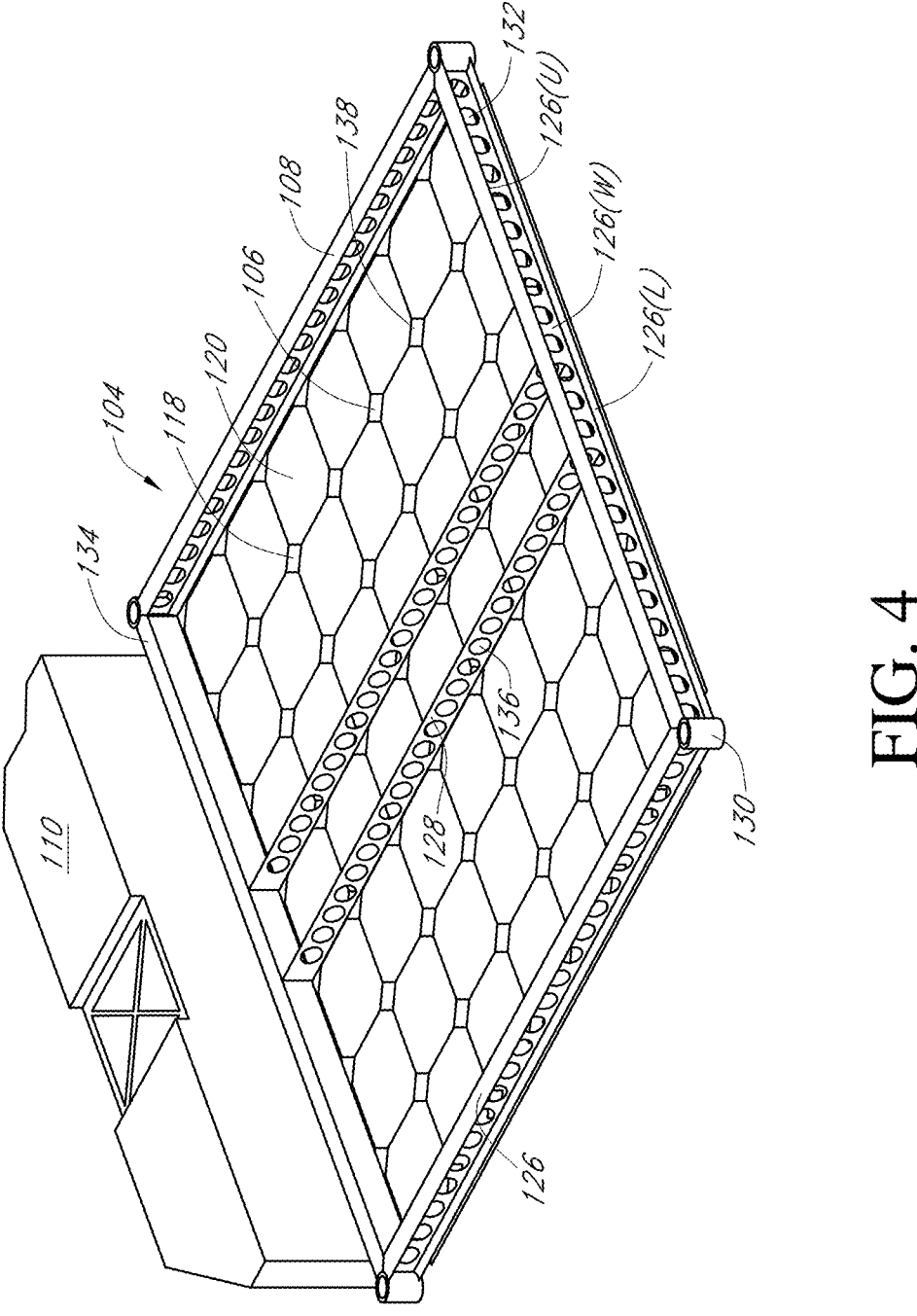
FIG. 4 is an upper perspective view of one of the satellites of the satellite stack of FIG. 1 according to some examples.
Figure 7:
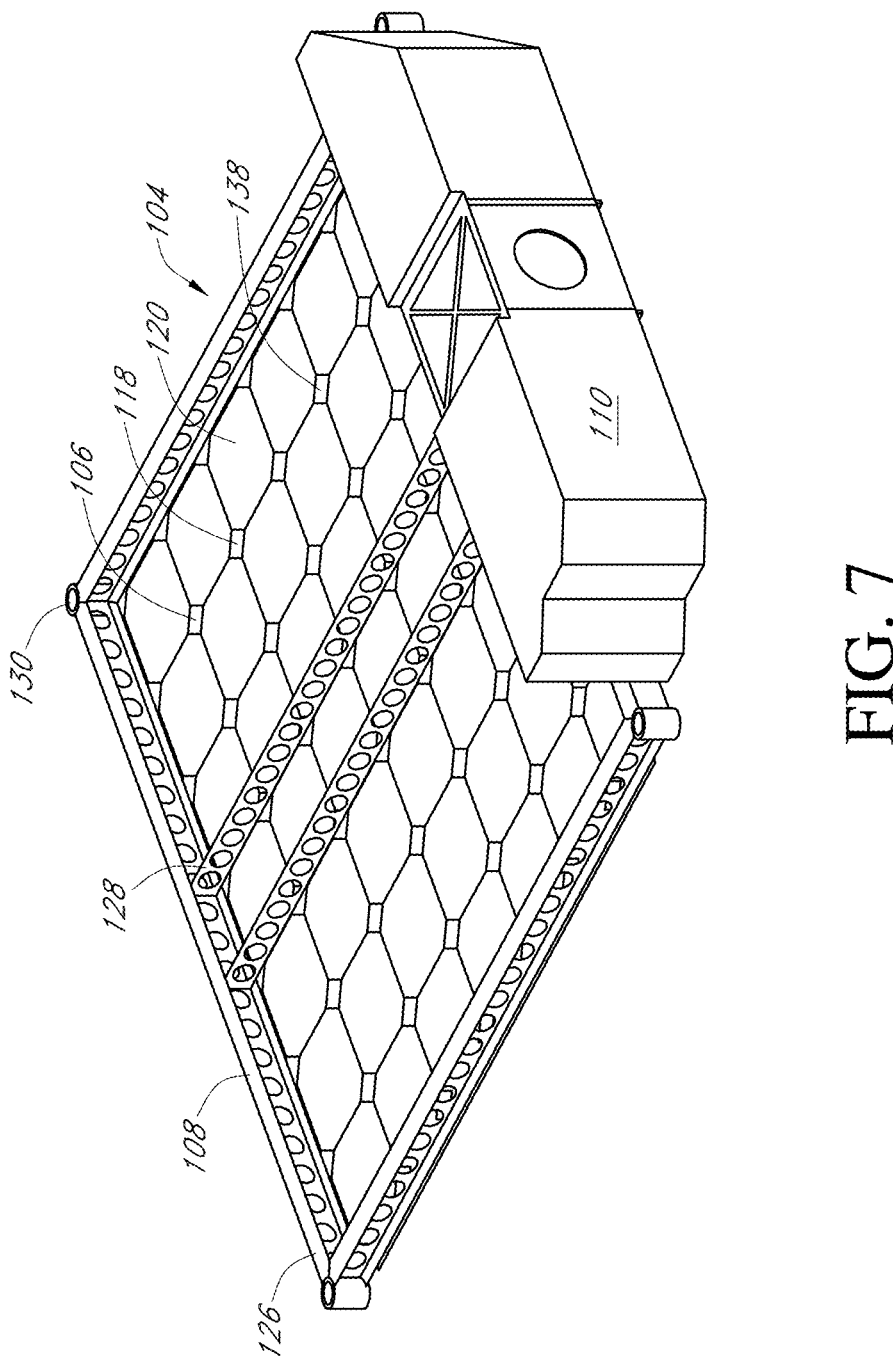
FIG. 7 is another upper perspective view of the satellite of FIG. 4 according to some examples.
Figure 8:
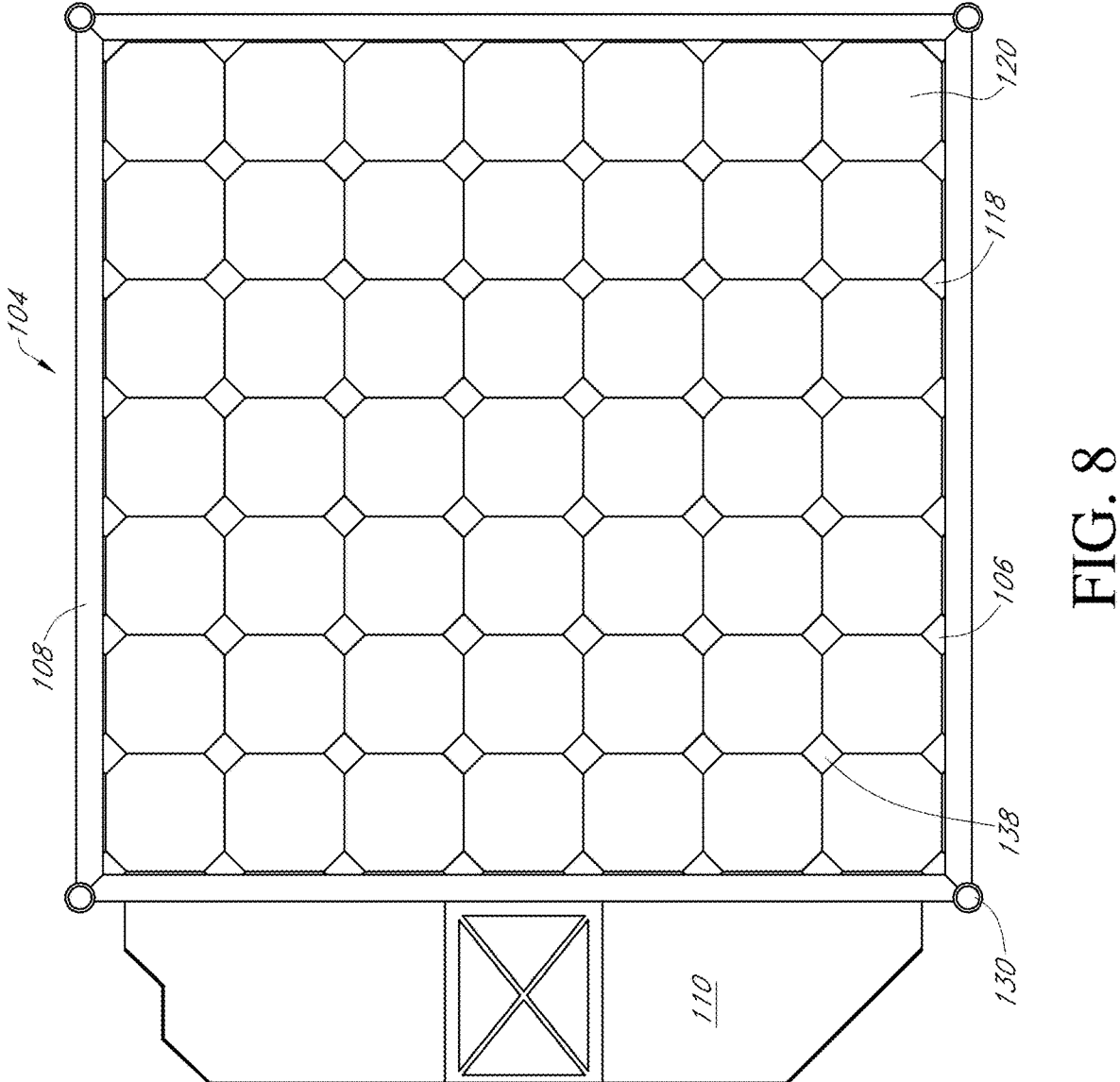
FIGS. 8 and 9 are top and bottom views, respectively, of the satellite of FIG. 4 according to some examples.
Figure 9:
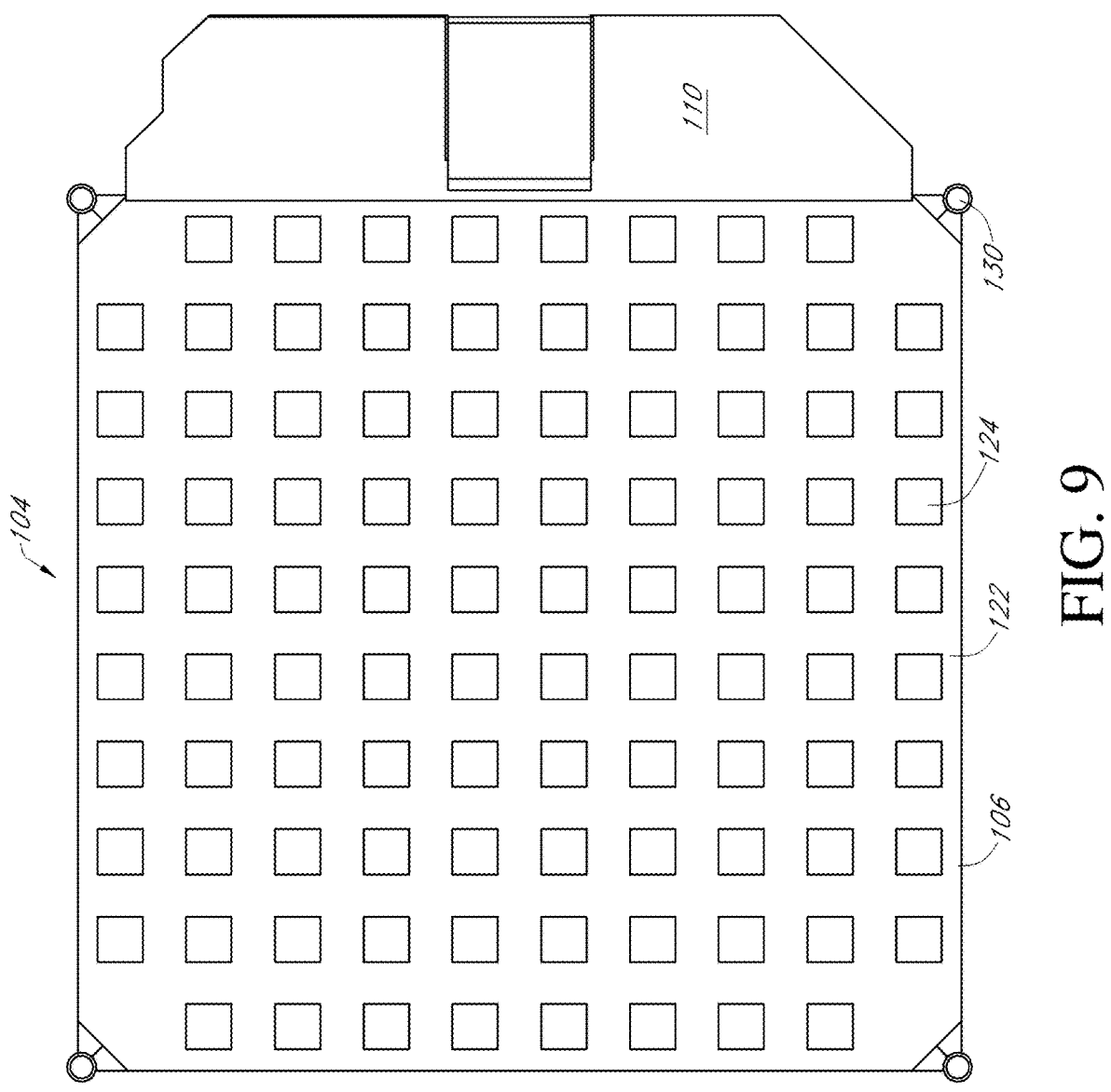

In some embodiments, with reference to FIGS. 4 and 7, the support structure 108 associated with the planar portion 106 comprises rails 126 extending along edges of the planar portion 106 and/or rails 128 extending across the planar portion 106. In alternative embodiments, the support structure 108 may comprise rails extending diagonally across the planar portion 106, such as between opposite corners, and/or extending in any other direction across the planar portion 106. The rails 126, 128 advantageously increase flexural rigidity of the planar portion 106, which enhances the robustness of the satellite 104 and reduces the likelihood of the satellite 104 being damaged by stresses present in the launch environment. In the illustrated embodiment, each of the rails 126 that extend along the edges of the planar portion 106 terminates at a corner support 130 comprising a tubular post. The tubular configuration of the corner supports 130 reduces their weight while maintaining the ability of the corner supports 130 to resist compressive loads and to secure the ends of the rails 126. In some embodiments, when the satellites 104 are stacked as shown in FIGS. 1 and 2, the corner supports 130 of adjacent satellites 104 may abut one another such that the corner supports 130 of a given satellite 104 in the stack 100 are supported from beneath by the corner supports 130 of the satellite 104 immediately beneath. In the illustrated embodiment, the heights of the corner supports 130 are substantially equal to the heights of the rails 126 that extend along the edges of the planar portion 106. In alternative embodiments, however, the heights of the corner supports 130 may be less than, or greater than, the heights of the rails 126.

In the illustrated embodiment, with reference to FIG. 4, three of the rails 126 that extend along the edges of the planar portion 106 have an I-shaped cross-section with upper and lower flanges 126(U), 126(L) connected by a web 126(W). The web 126(W) is perforated with a series of equally spaced circular openings 132 to reduce the weight of the rails 126 while maintaining the ability of the rails 126 to resist flexural and torsional loads applied to the planar portion 106. In alternative embodiments, these rails 126 may have other cross-sectional shapes, such as rectangular, and may not include openings 132, or the openings may have a different configuration. For example, the rail 134 that abuts the subsystems housing 110 has a square tubular cross-section, and doesn't include openings, such that the rail 134 provides greater stiffness compared to the rails 126. In alternative embodiments, however, the rail 134 that abuts the subsystems housing 110 may have the same shape as the rails 126. In the illustrated embodiment, the rails 128 extending across the planar portion 106 are shaped as flat strips or plates that lie perpendicular to the planar portion 106. The rails 128 are perforated with a series of equally spaced circular openings 136 to reduce the weight of the rails 128 while maintaining the ability of the rails 126 to resist flexural and torsional loads applied to the planar portion 106. In alternative embodiments, these rails 128 may have other cross-sectional shapes, such as I-shaped, and may not include openings 136, or the openings may have a different configuration. In the illustrated embodiment, two rails 128 extend perpendicular to the rail 134 that abuts the subsystems housing 110 and they are equally spaced from a centerline of the planar portion 106 that extends perpendicular to the rail 134 that abuts the subsystems housing 110. In alternative embodiments, more rails, or fewer rails (including zero) may be provided, and the rails may extend in different directions, such as perpendicular to the illustrated direction, or both parallel and perpendicular to the illustrated direction, or diagonally across the planar portion 106.

In the illustrated embodiment, the rails 126, 128 and the corner supports 130 are located on the same surface 118 of the planar portion 106 as the solar cells 120. In alternative embodiments, the rails 126, 128 and the corner supports 130 may be located on the same surface 122 of the planar portion 106 as the antennas 124. In still further embodiments, the rails 126, 128 and the corner supports 130 may be located on both surfaces 118, 122 of the planar portion 106.

In some embodiments, the rails 126, 128 and the corner supports 130 may comprise one or more metals, such as aluminum, copper, steel, etc., or one or more plastics, or a composite material, such as a fiber-reinforced plastic, or carbon fiber, or one or more foam materials, such as a polymethacrylimide (PMI)-based structural foam (e.g., ROHACELL®), or a closed-cell or open-cell foam. The rails 126 may be secured to the corner supports 130 by any suitable technique, such as welding (e.g., ultrasonic welding), adhesive, or any other technique. In some embodiments, the rails 126, 128 and the corner supports 130 may comprise a unitary structure. For example, the rails 126, 128 and the corner supports 130 may be formed from a single piece of molded plastic or composite material or a single piece of machined metal. The rails 126, 128 and the corner supports 130 may be secured to the planar portion 106 by any suitable technique, such as welding (e.g., ultrasonic welding), fasteners (e.g., screws), adhesive, friction, or any other technique.

In some embodiments, the support base 102 may comprise one or more plastics, or a composite material, such as a fiber-reinforced plastic. The planar central portion 112 and the peripheral portions 114 may comprise a unitary structure. For example, the support base 102 may be formed from a single piece of molded plastic or composite material. In alternative embodiments, the planar central portion 112 and the peripheral portions 114 may comprise separate pieces secured to one another by any suitable technique, such as welding (e.g., ultrasonic welding), adhesive, or any other technique. In still further embodiments, the planar central portion 112 and the peripheral portions 114 may comprise separate pieces that are not secured to one another. In some embodiments, either or both of the planar central portion 112 and the peripheral portions 114 may be hollow and/or perforated to reduce their weight.

In some embodiments, the support structure 108 associated with the planar portion 106 comprises columnar supports arranged about the planar portion 106. For example, the columnar supports may be shaped as cylindrical or tubular posts, and may be distributed across at least one surface 118, 122 of the planar portion 106. In some embodiments, the columnar supports may be located on the upper surface 118 (zenith-facing surface when in orbit) of the planar portion 106 and may occupy some or all of the interstitial areas 138 of the planar portion 106 between the solar cells 120, thereby forming a grid pattern. The columnar supports may be substantially the same height as the rails 126, 128 and the corner supports 130, and may thereby abut and support the planar portion 106 of the satellite 104 immediately above when the satellites 104 are stacked as shown in FIGS. 1 and 2. While the columnar supports are not shown in FIGS. 1-9, examples are described below and illustrated in FIG. 12.

FIGS. 10-18 illustrate alternative configurations for satellites and satellite stacks according to some examples. In these figures, structural and configurational characteristics of the satellites and satellite stacks may be as described above with respect to FIGS. 1-9 except as otherwise described below.

Figure 10:
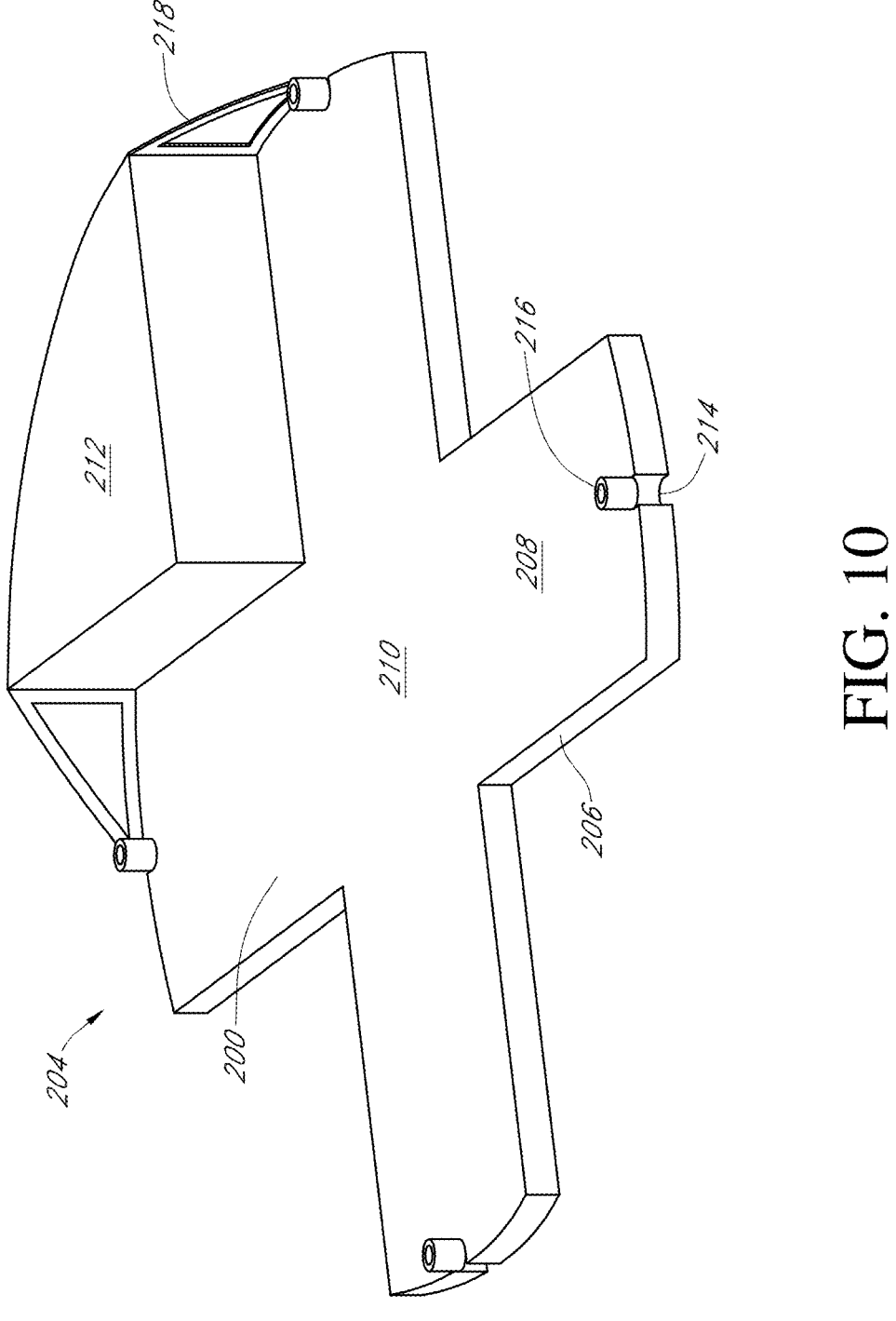
FIGS. 10 and 11 are upper (zenith-facing side when in orbit) and lower (nadir-facing side when in orbit) perspective views, respectively, of another satellite according to some examples.
Figure 11:
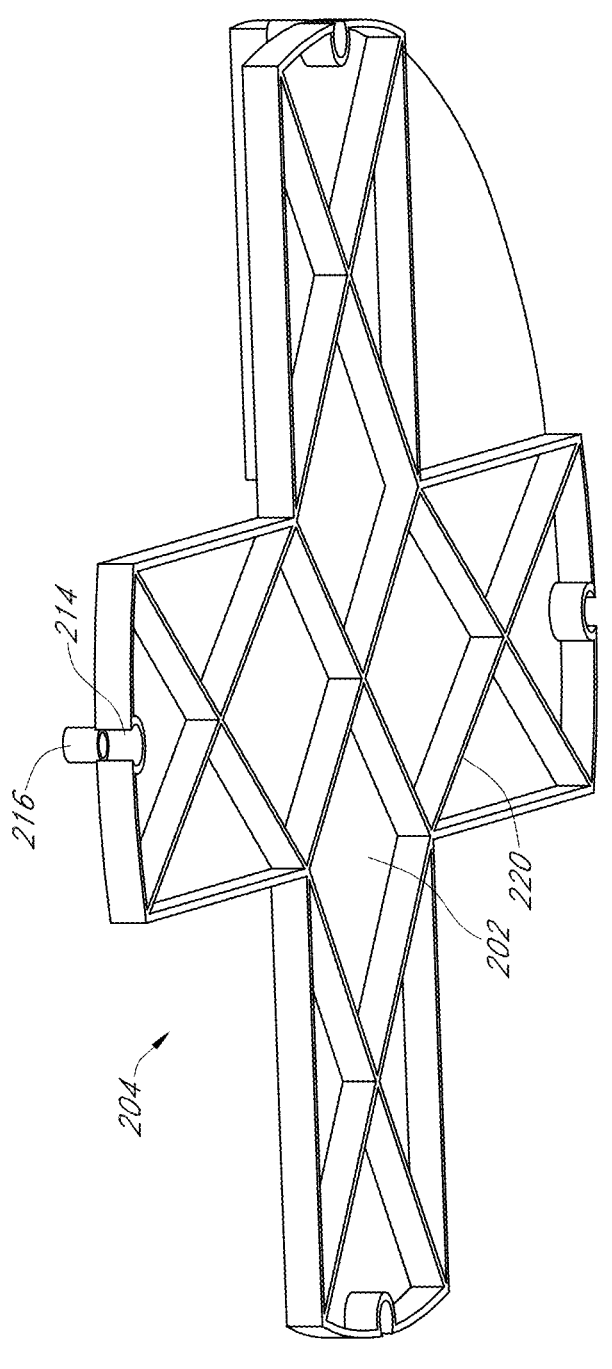

FIGS. 10 and 11 illustrate upper (zenith-facing side when in orbit) and lower (nadir-facing side when in orbit) surfaces 200, 202, respectively, of another satellite 204 according to some examples. The satellite 204 is shaped generally like an X or a plus sign including a planar portion 206 having four arms 208 extending outward from a central portion 210. A subsystems housing 212 is located between adjacent arms 208 of the planar portion 206, and is shaped generally like a wedge or a pic piece. As in the embodiments described above with reference to FIGS. 1-9, the upper surface 200 of the planar portion 206 may include solar cells (not shown) and the lower surface 202 of the planar portion 206 may include a payload (e.g., one or more antennas, not shown).

Outer edges of each of the arms 208 include a generally semi-circular indentation 214 that receives a tubular post 216. With reference to FIG. 10, support members 218 on either side of the subsystems housing 212 help to stabilize the subsystems housing 212 and secure it to the arms 208 of the planar portion 206. In the illustrated embodiment, the support members 218 are triangularly shaped and may be secured to the subsystems housing 212 and the planar portion 206 by any suitable technique, such as welds (e.g., ultrasonic welds) or adhesive. With reference to FIG. 11, the lower surface 202 of the planar portion 206 includes a support structure 220 that increases the flexural rigidity of the planar portion 206. In the illustrated embodiment, the support structure 220 is configured as a lattice having intersecting strips forming a diagonal pattern of open spaces between the strips. The lattice configuration advantageously reduces the weight of the support structure 220 while maintaining the ability of the support structure 220 to resist flexing of the planar portion 206. In some embodiments, the support structure 220 may comprise foam, such as a polymethacrylimide (PMI)-based structural foam (e.g., ROHACELL®), or a closed-cell or open-cell foam, or another material.

Figure 12:
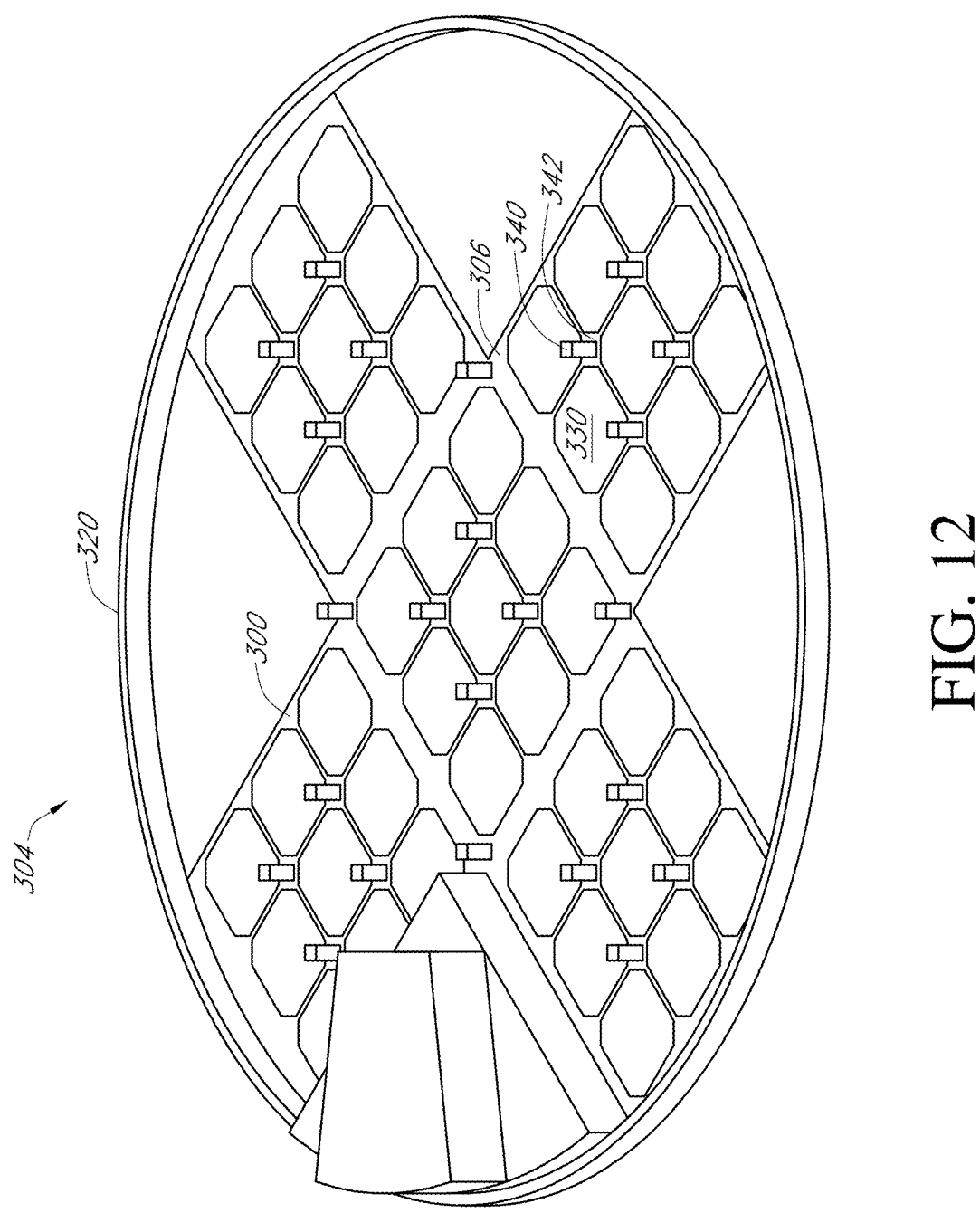
FIG. 12 is a lower perspective view of another satellite according to some examples.

FIG. 12 illustrates an upper (zenith-facing side when in orbit) surface 300 of another satellite 304 according to some examples. The satellite 304 is shaped similarly to the satellite 204 of FIGS. 10 and 11, but includes a different support structure 320. In the embodiment of FIG. 12, the support structure 320 is shaped as a ring that extends around the periphery of the planar portion 306. The support structure 320 may be secured to outer edges of the planar portion 306 by any suitable technique, such as welds (e.g., ultrasonic welds) or adhesive. FIG. 12 also illustrates solar cells 330 and columnar supports 340 arranged about the upper surface 300 in spaces 342 between the solar cells 330.

Figure 13:
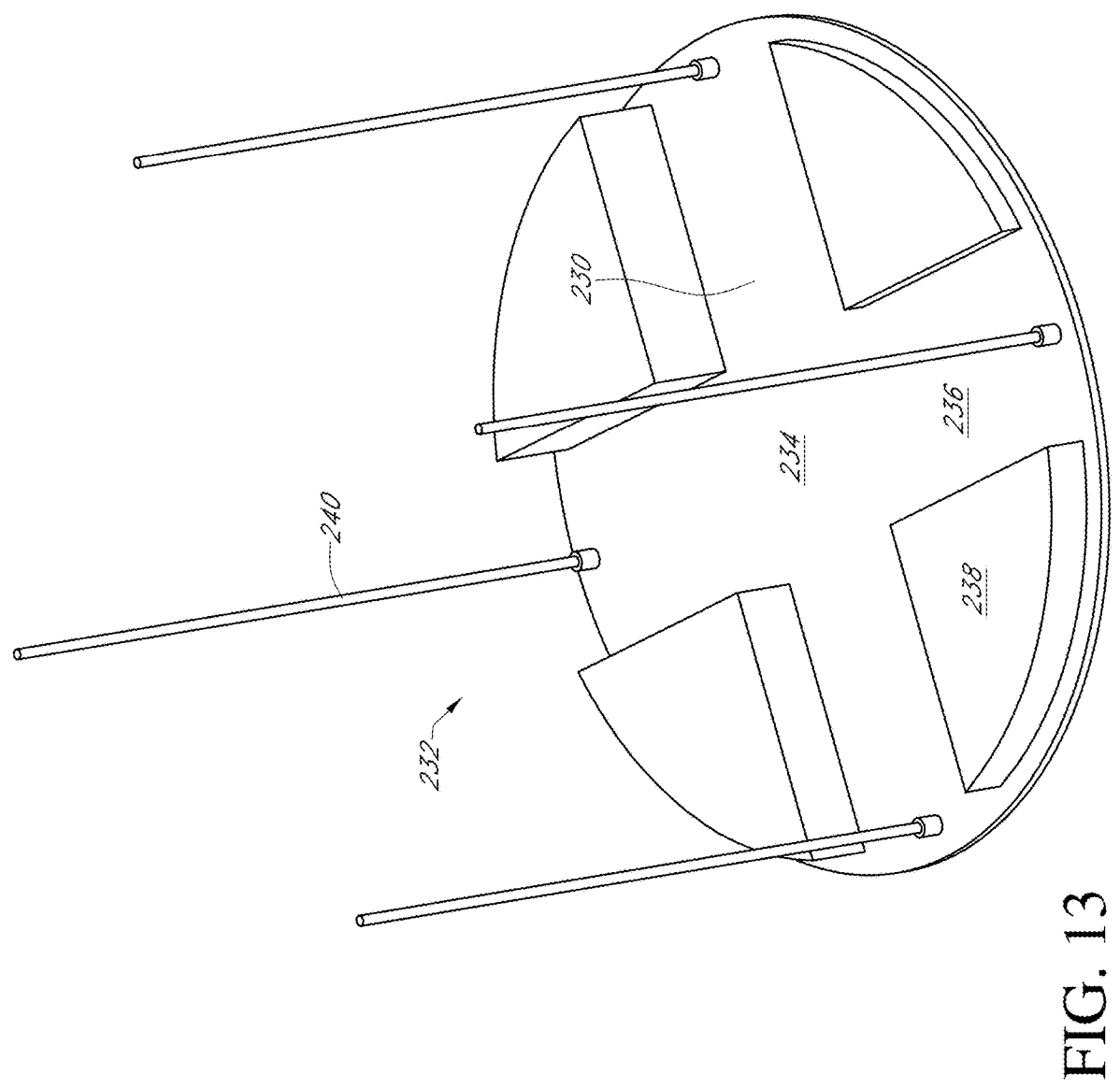
FIG. 13 is an upper perspective view of another support base according to some examples.

FIG. 13 illustrates an upper surface 230 of another support base 232 according to some examples. The support base 232 is circular and configured to support satellites 204, 304 having the shapes and configurations described above with reference to FIGS. 10-12. In particular, the support base 232 is shaped generally like an X or a plus sign having four arms 234 extending outward from a central portion 236. Four wedge-shaped peripheral portions 238 are located between adjacent arms 234 of the central portion 236. The peripheral portions 238 have stepped heights similar to the peripheral portions 114 of the support base 102 described above with reference to FIG. 3. The support base 232 further includes support rods 240 extending upward from end portions of each of the arms 234. The support rods 240 are received within the tubular posts 216 of the satellites 204 when the satellites 204 are stacked onto the support base 232, as shown in FIGS. 14 and 15, to reinforce the stack 250 and prevent the satellites 204 from shifting relative to one another under the influence of vibrations in the launch environment.

Figure 14:
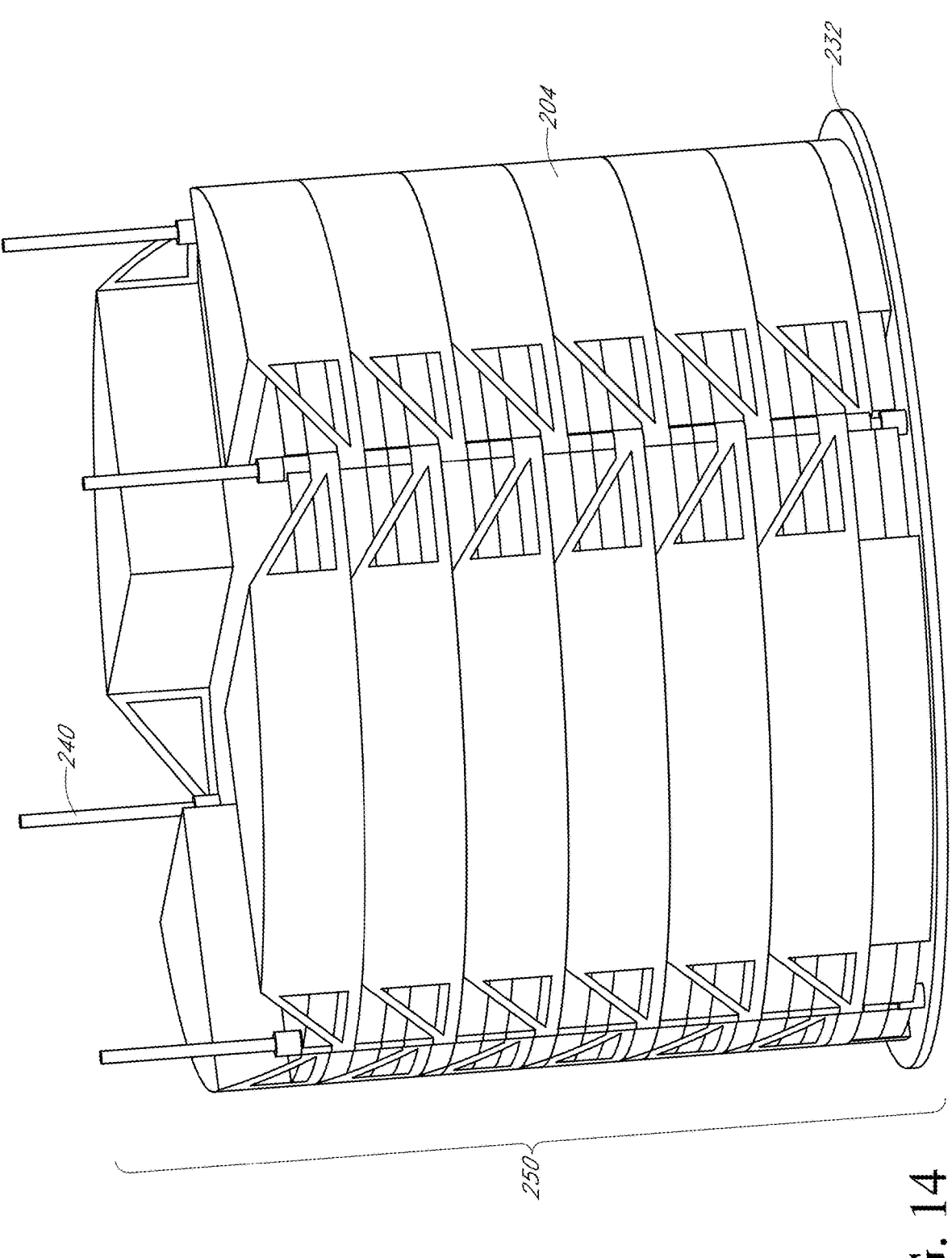
FIG. 14 is a side perspective view of another satellite stack with support base, including the satellite of FIGS. 10 and 11 and the support base of FIG. 13, according to some examples.
Figure 15:
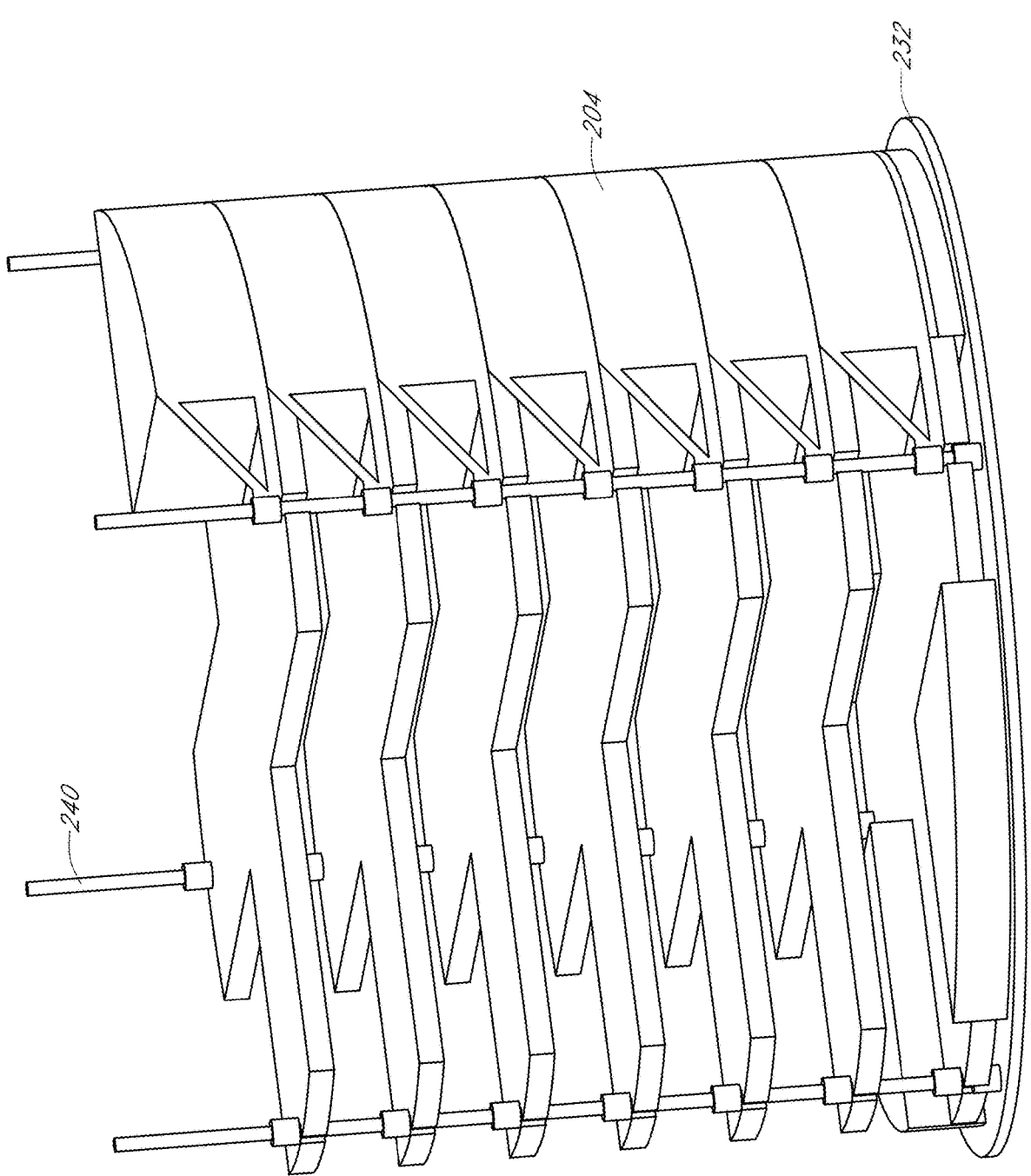
FIG. 15 is a side perspective view of a portion of the satellite stack with support base of FIG. 14, illustrating only every fourth satellite in the stack, according to some examples.

FIG. 14 illustrates a satellite stack 250 including 24 satellites 204, and FIG. 15 illustrates a portion of the satellite stack 250 of FIG. 14, illustrating only every fourth satellite 204 in the stack 250. The satellites 204 in the stack of FIG. 14 are each rotated 90° with respect to the satellite 204 immediately beneath, as described above with reference to FIGS. 1 and 2, such that the planar portions 206 of the satellites 204 support one another and the subsystems housings 212 of the satellites 204 support one another. Similarly, the peripheral portions 238 of the support base 232 support the subsystems housings 212 of the four satellites 204 in the stack 250 located closest to the bottom of the stack 250.

Figure 16:
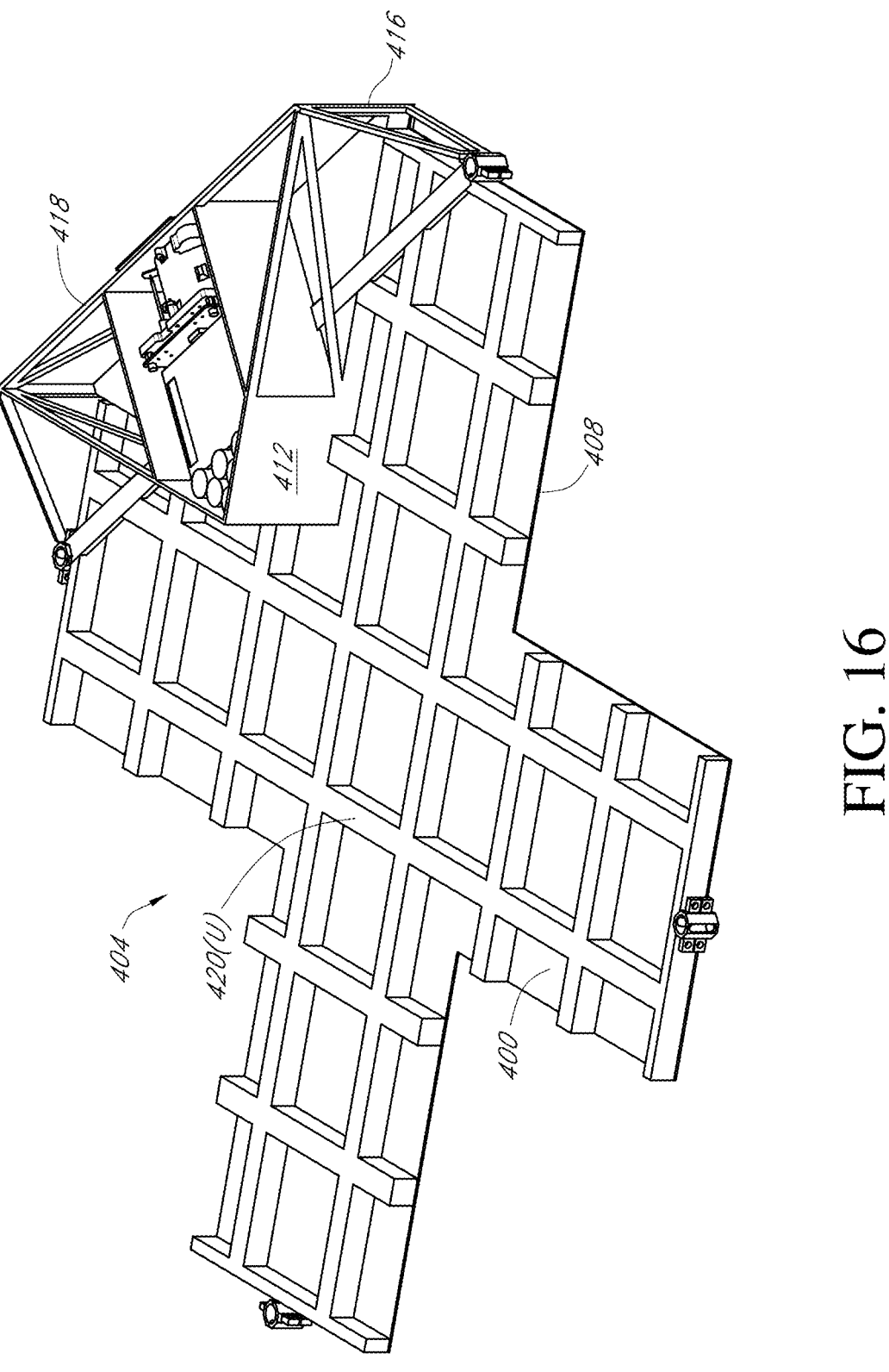
FIGS. 16 and 17 are upper and lower perspective views, respectively, of another satellite according to some examples.
Figure 17:
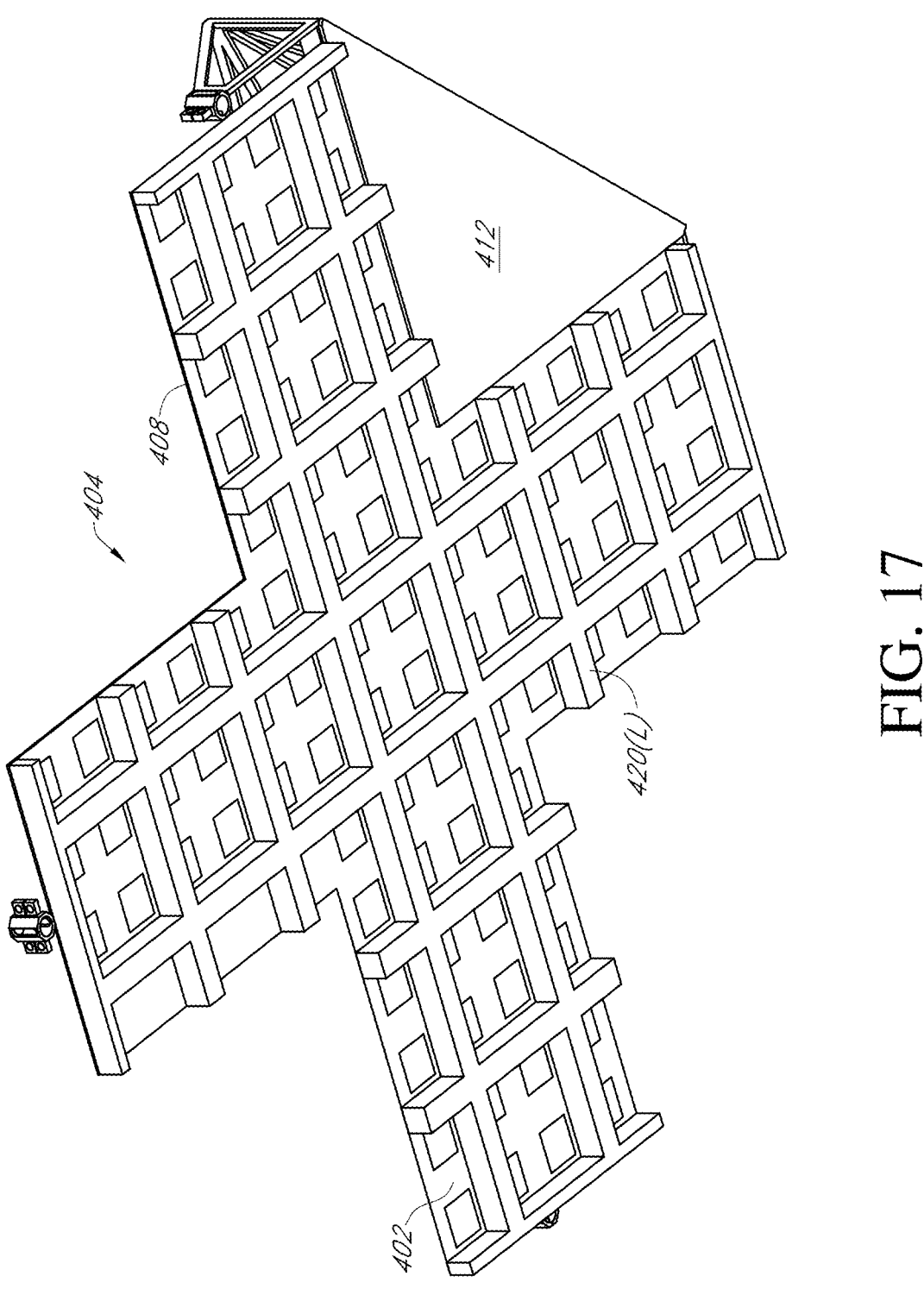
Figure 18:
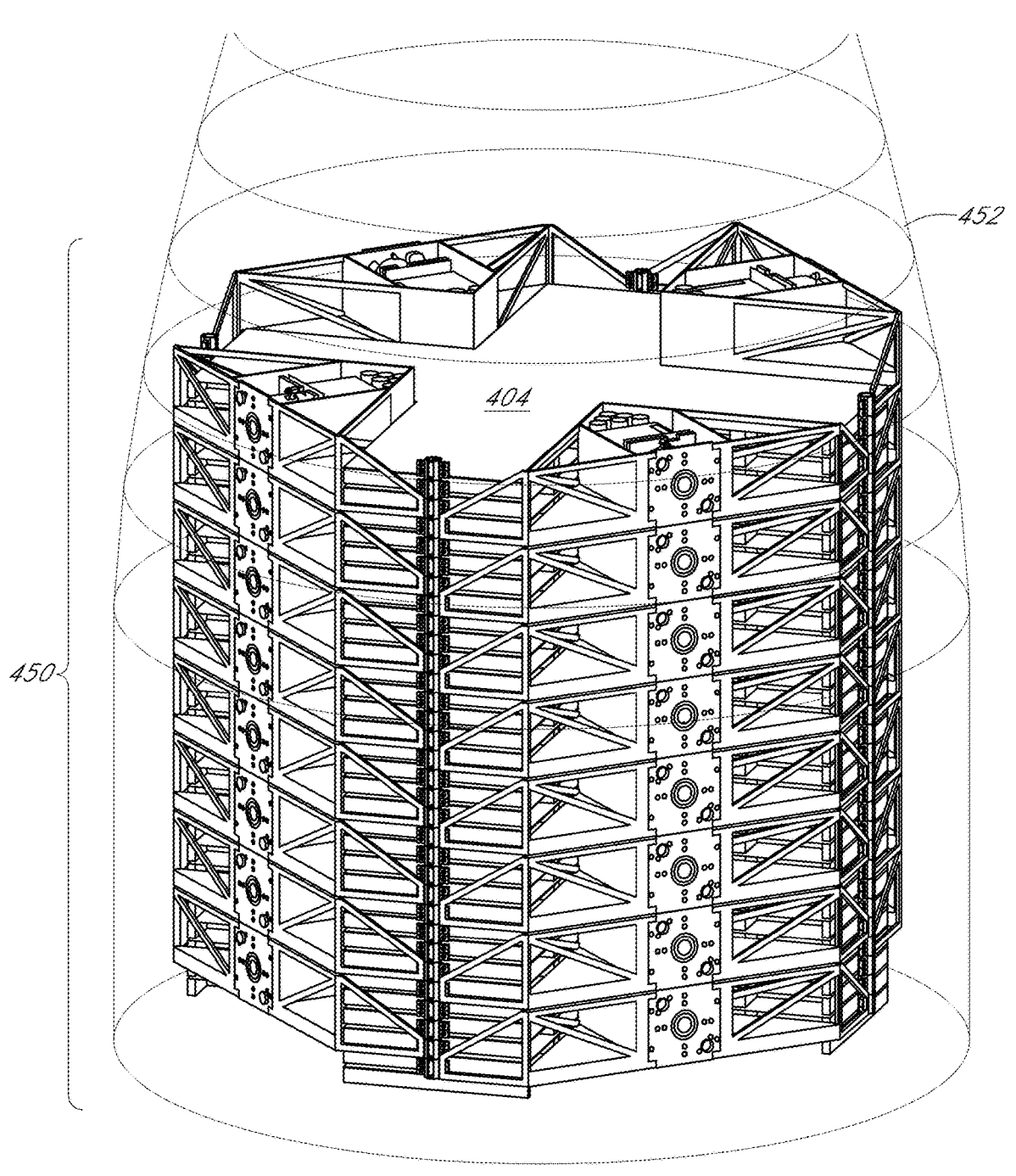
FIG. 18 is an upper perspective view of another satellite stack, including the satellite of FIGS. 16 and 17, according to some examples.

FIGS. 16 and 17 illustrate upper (zenith-facing side when in orbit) and lower (nadir-facing side when in orbit) surfaces 400, 402, respectively, of another satellite 404 according to some examples. The satellite 404 of FIGS. 16 and 17 includes a lattice-shaped support structure 420 on both the upper surface 400 and the lower surface 402 to increase the flexural rigidity of the satellite 404. The subsystems housing 412 is generally wedge-shaped, lies between adjacent arms 408 of the satellite 404, and includes support members 418 configured generally as a truss on either side. The support members 418 extend between sides of the subsystems housing 412, posts 416 at the corners of the subsystems housing 412, and edges of the arms 408 to help stabilize the subsystems housing 412 and secure it to the arms 408. FIG. 18 illustrates a satellite stack 450 including 32 satellites 404 located within a payload fairing 452.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix numerals (e.g., 104(3), 104(4), etc.) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix numerals might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A satellite stack comprising:
satellites arranged in a stack, wherein:
    each satellite in the stack has a planar portion with an associated support structure and a subsystems housing containing satellite subsystems extending along an edge of the planar portion;
    for each satellite, a height of the subsystems housing is greater than a combined height of the planar portion and the associated support structure;
    each satellite is oriented at a nonzero rotational angle with respect to the satellite immediately beneath, such that no satellite has its subsystems housing positioned directly above the subsystems housing of the satellite immediately beneath; and
    for at least one of the satellites, the height of the subsystems housing is a whole-number multiple of a combined height of the planar portion and the associated support structure of the satellite.

2. The satellite stack of claim 1, wherein, for at least one of the satellites, the subsystems housing extends along only one edge of the planar portion of the satellite.

3. The satellite stack of claim 1, wherein the whole-number multiple is four.

4. The satellite stack of claim 1, wherein the subsystems housing of each satellite is positioned directly above the subsystems housing of the satellite that is the whole-number multiple of satellites below that satellite in the stack.

5. A satellite stack comprising:
satellites arranged in a stack, wherein:
    each satellite in the stack has a planar portion with an associated support structure and a subsystems housing containing satellite subsystems extending along an edge of the planar portion;
    for each satellite, a height of the subsystems housing is greater than a combined height of the planar portion and the associated support structure; and
    each satellite is oriented at a nonzero rotational angle with respect to the satellite immediately beneath, such that no satellite has its subsystems housing positioned directly above the subsystems housing of the satellite immediately beneath;
    the satellite stack further comprising a support base immediately beneath a bottommost satellite of the stack, wherein the support base includes a planar central portion and a plurality of peripheral portions arranged at edges of the central portion, and wherein each of the peripheral portions has a different height.

6. The satellite stack of claim 5, wherein the heights of the peripheral portions increase in a stepped manner by a same amount in a first direction around a perimeter of the central portion.

7. The satellite stack of claim 5, wherein the peripheral portions abut the subsystems housings of respective ones of the satellites in the stack.

8. A satellite stack comprising:
satellites arranged in a stack, wherein:
    each satellite in the stack has a planar portion with an associated support structure and a subsystems housing containing satellite subsystems extending along an edge of the planar portion;
    for each satellite, a height of the subsystems housing is greater than a combined height of the planar portion and the associated support structure; and
    each satellite is oriented at a 90° rotational angle with respect to the satellite immediately beneath, such that no satellite has its subsystems housing positioned directly above the subsystems housing of the satellite immediately beneath.

9. The satellite stack of claim 8, wherein, for at least one of the satellites, the subsystems housing extends along only one edge of the planar portion of the satellite.

10. The satellite stack of claim 8, further comprising a support base immediately beneath a bottommost satellite of the stack, wherein the support base includes a planar central portion and a plurality of peripheral portions arranged at edges of the central portion, and wherein each of the peripheral portions has a different height.

11. The satellite stack of claim 10, wherein the peripheral portions abut the subsystems housings of respective ones of the satellites in the stack.

12. A satellite comprising:
a planar portion comprising a printed circuit board (PCB);
a support structure that increases flexural rigidity of the PCB, the support structure comprising rails extending along edges of the PCB; and
a subsystems housing containing satellite subsystems extending along only one edge of the PCB.

13. The satellite of claim 12, wherein the support structure further comprises rails extending across the PCB.

14. The satellite of claim 12, wherein the support structure further comprises columnar supports arranged about the PCB.

15. The satellite of claim 14, wherein the columnar supports are arranged in a grid pattern about the PCB.

16. A satellite comprising:

a planar printed circuit board (PCB);

a support structure that increases flexural rigidity of the PCB, the support structure comprising rails extending across the PCB; and a subsystems housing containing satellite subsystems extending along only one edge of the PCB.

17. The satellite of claim 16, wherein the support structure further comprises columnar supports arranged about the PCB.

18. The satellite of claim 17, wherein the columnar supports are arranged in a grid pattern about the PCB.

19. A satellite comprising:

a planar printed circuit board (PCB);

a support structure that increases flexural rigidity of the PCB, the support structure comprising a foam grid along at least one surface of the PCB; and a subsystems housing containing satellite subsystems extending along only one edge of the PCB.

20. The satellite of claim 19, wherein the support structure has intersecting strips forming a diagonal pattern of open spaces between the strips.

\* \* \* \* \*